United States Patent [19]

Greve et al.

[11] Patent Number: 5,246,070

[45] Date of Patent: Sep. 21, 1993

[54] PIPING FOR THE COMPLETION OF A GROUNDWATER MONITORING SITE

[75] Inventors: Horst Greve, Edemissen; Konrad Gries, Hohenhamein, both of Fed. Rep. of Germany

[73] Assignee: Preussag Aktiengesellschaft, Hannover, Fed. Rep. of Germany

[21] Appl. No.: 768,555

[22] PCT Filed: Jan. 26, 1991

[86] PCT No.: PCT/DE91/00078

§ 371 Date: Sep. 27, 1991

§ 102(e) Date: Sep. 27, 1991

[87] PCT Pub. No.: WO91/12410

PCT Pub. Date: Aug. 22, 1991

[30] Foreign Application Priority Data

Feb. 7, 1990 [DE] Fed. Rep. of Germany ....... 4003584

[51] Int. Cl.[5] .................... E21B 17/18; E21B 49/08
[52] U.S. Cl. .................. 166/242; 166/250; 166/313
[58] Field of Search .............. 166/242, 313, 250, 74, 166/227; 285/137.1, 137.2

[56] References Cited

U.S. PATENT DOCUMENTS

| 1,876,627 | 9/1932 | Davis et al. ..................... 175/215 |
| 2,605,637 | 8/1952 | Rhoades ........................ 166/313 X |
| 3,330,349 | 7/1967 | Owsley et al. ................. 166/247 X |
| 3,483,992 | 12/1969 | Fournier ........................ 210/497.1 |
| 3,678,999 | 7/1972 | Kulikov et al. ................. 166/236 |
| 3,881,755 | 5/1975 | Brunato ........................ 285/137.2 |
| 3,884,512 | 5/1975 | Weseh ........................... 166/242 X |
| 4,424,859 | 1/1984 | Sims et al. ..................... 166/313 |
| 4,548,266 | 10/1985 | Burklund ........................ 166/250 |
| 4,683,944 | 8/1987 | Curlett ......................... 166/242 X |
| 4,834,825 | 5/1989 | Adams et al. .................. 285/137.1 X |

FOREIGN PATENT DOCUMENTS 3012709 10/1981 Fed. Rep. of Germany.
3423917 11/1984 Fed. Rep. of Germany.
252683 11/1983 France.

Primary Examiner—Hoang C. Dang
Attorney, Agent, or Firm—Nikaido, Marmelstein, Murray & Oram

[57] ABSTRACT

To complete a groundwater monitoring site including several monitoring points disposed at different depths, the piping includes a single multi-conduit pipe (1) having a smooth, tightly packable outer wall and being composed of individual pipe lengths (4) which are coupled to each other in a sealed relationship. The pipe lengths (4) are subdivided in the longitudinal direction into several conduits (6a-6d) by partition walls (5) and are coupled to each other in such a fashion that their conduits (6a-6d) are in relative alignment at the junctures and not reduced in area. For the purpose of providing filter sections for the admission of water, individual pipe lengths are provided in their outer wall with filter slots (9) in the area of one or several conduits.

7 Claims, 3 Drawing Sheets

PIPING FOR THE COMPLETION OF A GROUNDWATER MONITORING SITE

FIELD OF THE INVENTION

This invention relates to a piping for the completion of a groundwater monitoring site including several monitoring points disposed in a common borehole at different depths.

BACKGROUND OF THE INVENTION

Groundwater monitoring sites, also referred to as water table monitoring wells or groundwater observation wells, serve the function of observing water tables and groundwater quality, particularly in the catchment area of water procurement plants. For constructing a groundwater monitoring site covering several aquifers at different depths, the first step involves drilling a borehole. On the basis of the geological profile of the borehole determined, the horizons for the individual monitoring points subject to observation are established. Subsequently, a string composed of individual pipes and carrying at its bottom end a filter pipe is installed for each monitoring point. Following installation of the strings, the borehole is packed with superposed layers of different materials. In the area of the monitoring points, the borehole is packed with filtering gravel. Layers of gravel filler and clay packing are conventionally provided between the individual monitoring points. In practice, major difficulties are frequently encountered in packing such known multiple monitoring points, because the position of the individual pipe strings within the borehole is only insufficiently controllable from above ground, particularly where boreholes of substantial depths are involved. An awkward position of the strings may result in insufficient packing of the borehole and in particular an insufficient sealing of the layers isolating the individual aquifers. This results in cross migration of waters corrupting the observation result.

To avoid these drawbacks, a pipe arrangement for monitoring the water table is already known (DE-PS 3,012,709) in which several pipes of different lengths interjoined close to their upper ends are installed in a steel casing which surrounds all pipes and is of a length approximately equal to the length of the longest pipe, in which the casing includes water inlet ports relatively spaced in a longitudinal direction in accordance with the position of the bottom ends of the pipes, the water inlet ports being coupled to the bottom end of the associated pipe through a manifold and being sealed against the interior of the casing. This arrangement facilitates the packing of the borehole annular chamber and the sealing of the layers isolating the individual aquifers. On the other hand, however, this pipe arrangement involves major constructional expenditure and is therefore only suited for small installation depths as they are sufficient for the observation of near-surface seepage waters. Further, the known pipe arrangement includes only small water inlet ports which do not permit sufficient quantities to be conveyed as they are necessary for withdrawing samples of groundwater.

SUMMARY OF THE INVENTION

It is an object of the present invention to devise a piping which enables a groundwater monitoring site of the type initially referred to to be completed at low cost and which ensures a good packing of the borehole and a reliable sealing of the layers isolating the individual monitoring points.

According to the present invention, this object is accomplished in that a single multi-conduit pipe is provided which is composed of individual pipe lengths which are coupled to each other in a sealed relationship and are subdivided in the longitudinal direction into several conduits by partition walls, the multi-conduit pipe having a smooth, tightly packable outer wall which for the purpose of providing a filter includes filter slots in the area of the respective conduit.

The invention provides a piping for the completion of a groundwater monitoring site incorporating several monitoring points, which is as easy to install, as reliable to pack and seal as a single pipe string of a single monitoring point. The piping of the invention further has the advantage that it requires a borehole with only a relatively small diameter to be drilled, since it dispenses with the need for packing space between individual pipe strings.

According to a further proposal of the invention, the pipe ends of the multi-conduit pipe lengths may include cylindrical annular flanges which are adapted to be connected together by a cap nut, as well as locating means ensuring coaxial alignment of the conduits. In such a configuration, the individual pipe lengths can be interjoined easily, the outside diameter of the juncture remaining relatively small. Preferably, the circumferential surface of the pipe lengths is also of a cylindrical configuration. This enables an optimum sealing in the borehole to be accomplished and the provision of the pipe ends with annular flanges to be simplified. The circumferential surface may also be of a shape other than cylindrical, in which case, however, the radii of curvature of individual surface sections should not be below one tenth of the peripheral diameter, in order not to adversely affect the tight packing capability.

For relative sealing of the pipe ends at the junctures, the invention preferably provides for arrangement of a disk-shaped sealing means between the pipe ends which is apertured in the area of the conduit cross sections and carries on both sides seals resting against the end surfaces of the pipe lengths. This configuration has the advantage that the pipe ends may be provided with a plane end surface which is extremely favorable for the manufacture of the individual pipe lengths. In a preferred embodiment of the invention, the sealing means may be closed in the area of one conduit cross section. Configuring the sealing means in this manner makes it possible to close a conduit cross section, for example, at a location immediately beneath a filter section, in order to maintain the sump section at a short length.

In a preferred embodiment of the invention, the pipe lengths of the multi-conduit pipe are fabricated by extrusion methods out of plastics, with a longitudinal conduit of polygonal cross section being formed in the center of the pipe cross section by the partition walls converging there. The formation of such a central longitudinal conduit permits a cross-sectional shape suitable for manufacture to be achieved, since it dispenses with sharp corners at the junctures of the individual partition walls. The pipe cross-sectional shape as disclosed in the invention also offers advantages in respect of the configuration of the sealing means resting on the end surfaces of the pipe lengths. The longitudinal conduit may also serve the function of centrally locating and aligning the disk carrying the sealing means. For this purpose, the sealing means has on either side pins engaging in the longitudinal conduit. According to the invention, locating projections engaging in mating recesses in the pipe ends may be additionally provided on the outer periphery of the sealing means.

DESCRIPTION OF THE DRAWINGS

An embodiment of the present invention will now be described in more detail in the following with reference to the accompanying drawings. In the drawings.

DESCRIPTION OF THE PREFERRED EMBODIMENTS

Figure 1:
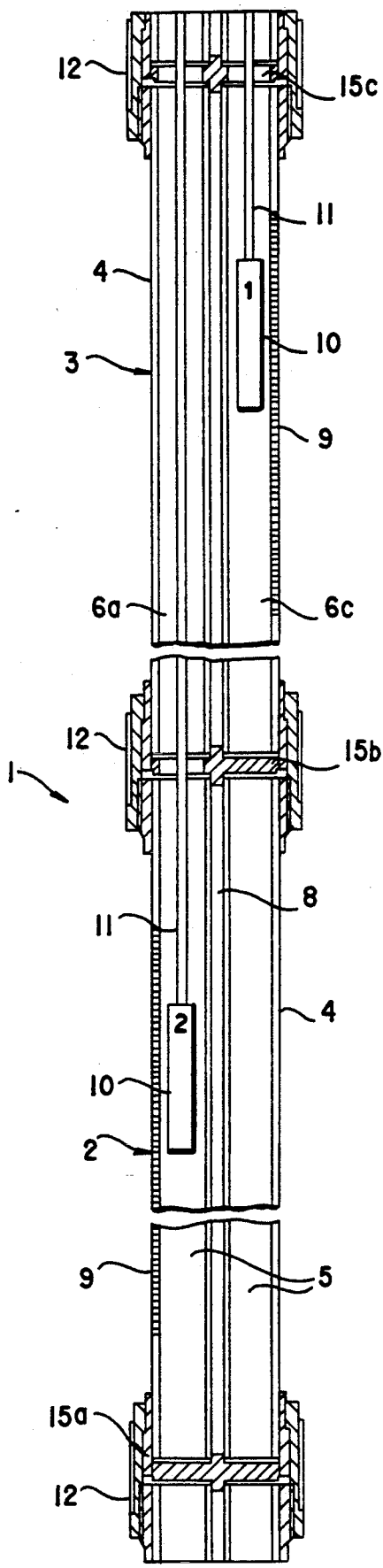
FIG. 1 is a longitudinal sectional view of sections of a multi-conduit pipe constructed in accordance with the invention.
Figure 4:
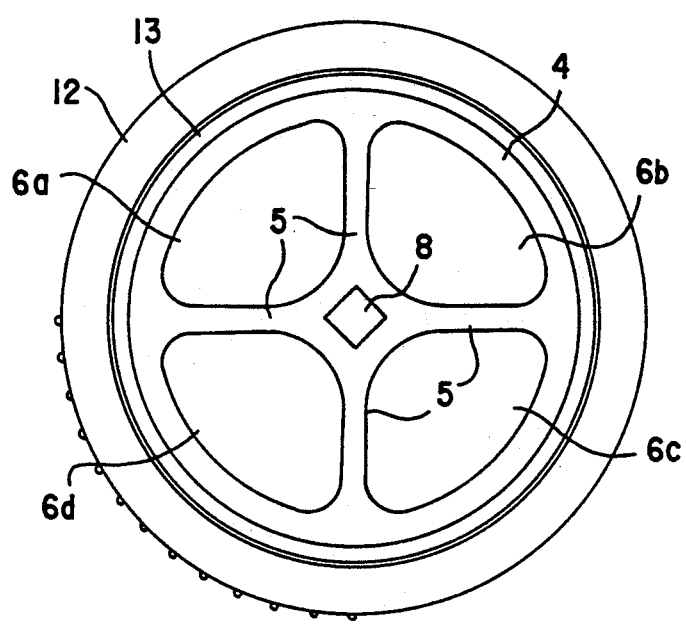
FIG. 4 is a front elevational view of the pipe end of FIG. 3 provided with the cap nut.

Referring now to FIG. 1, there is shown a lower end section 2 and an intermediate section 3 of a multi-conduit pipe 1. Both sections 2, 3 are formed of pipe lengths 4 which are composed of a cylindrical pipe subdivided by radial partition walls 5 into four conduits 6a to 6d extending in the longitudinal direction, the sectional view exposing a conduit 6a disposed in a first quadrant of the pipe cross section and a conduit 6c disposed in the third quadrant of the pipe cross section. Additionally, the partition walls 5 provide a dummy conduit 8 in the center of the pipe lengths 4 in order to avoid an accumulation of material by the convergence of the partition walls 5 and to facilitate the manufacture of the pipe lengths from thermoplastic plastics using an extrusion method. The arrangement of the individual conduits 6a to 6d and the dummy conduit 8 becomes apparent from FIG. 4.

In the area of conduit 6a, the outer wall of the pipe length 4 of the end section 2 is provided with filter slots 9 through which groundwater is allowed to enter the conduit 6. In the area of conduit 6c, the intermediate section 3 has likewise filter slots 9 through which the groundwater of a higher aquifer is allowed to enter the conduit 6c. Probes 10 serve to observe the water table and specific groundwater properties in the conduits 6a, 6c. They are connected to a monitoring station above ground by means of lines 11.

Figure 2:
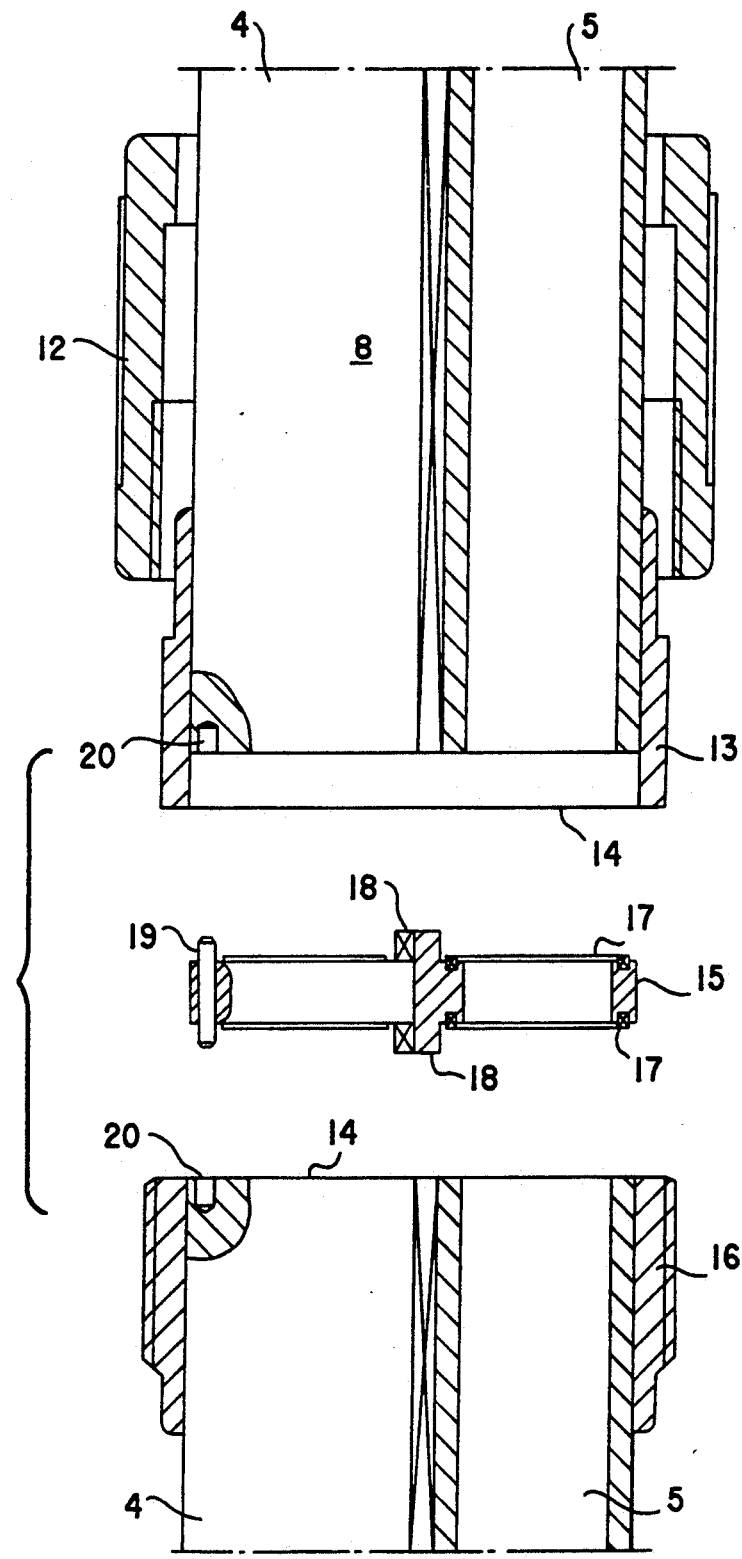
FIG. 2 is a sectional view of the pipe ends of two pipe lengths to be threadably coupled together and of the sealing means insertable intermediate the pipe ends of the multi-conduit pipe of FIG. 1.
Figure 3:
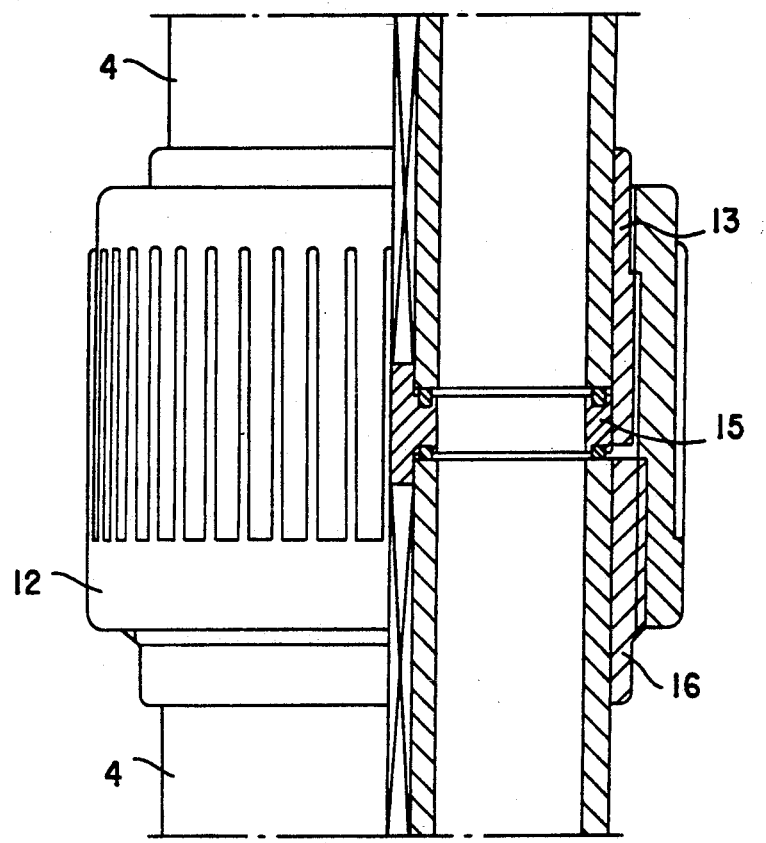
FIG. 3 is a sectional view of the pipe ends of FIG. 2 coupled together by thread engagement.

The coupling of two pipe lengths 4 is shown on an enlarged scale in FIGS. 2 and 3. Each pipe length 4 has at an end thereof a cap nut 12 and an annular collar 13 which is adapted to support the cap nut 12 in axial direction. The annular collar 13 is connected to the pipe length 4 preferably by gluing and extends beyond the end surface 14 of the end of the pipe length in order to be able to receive in its bore a sealing means 15. The other end of the pipe lengths 4 is provided with a threaded collar 16 adapted to engage with the respective threads of the cap nut 12. The threaded collar 16 is attached to the pipe length 4 equally by gluing.

In its cross-sectional shape, the sealing means 15 is conformed to the pipe lengths 4, having on either side elastic seals 17 resting on the end surfaces 14 of the pipe lengths 4 and isolating the individual conduits 6a, 6b, 6c, 6d. The sealing means 15 has in its center a pin 18 extending to either side for engagement in the respective dummy conduit 8 of the respective pipe length 4. Further, an adjusting pin 19 is provided on the periphery of the sealing means 15 which protrudes from either side and engages in a respective bore 20 in the respective end surface 14 of the respective pipe length 4 connected with the sealing means for accurate relative alignment of the conduits of the respective pipe length. The bores 20 for engagement of the adjusting pin 19 further serve as identifying means for the individual conduits in the assembly of the multi-conduit pipe 1.

Depending on the specific application, the sealing means 15 may be apertured or, alternatively, completely closed in the area of all conduits 6a to 6d or only in the area of individual conduits. Thus, for example, a completely closed sealing means 15a is suitably provided at the lower end of the end section 2 of FIG. 1 in order to completely close the lower end of the multi-conduit pipe 1. The sealing means 15b at the lower end of the intermediate section 3 has to be apertured in the area of the conduit 6a so that the filter section of this conduit remains accessible to the probe 10 and other instrumentation in the area of the end section. In the area of conduit 6c, the sealing means 15b is closed to prevent the formation of an excessively long sump section below the filter slots 9. In the area of conduits 6b and 6d not shown, the sealing means 15b may be either apertured or closed if these conduits are not used yet at this depth. The sealing means 15c located higher up has to be apertured at least in the area of conduits 6a and 6c. Thus it becomes apparent that different sealing means 15 are required for the entire length of the multi-conduit pipe 1, three versions being generally sufficient, namely, a version apertured all over, a version closed all over, and a version which is closed only in the area of one conduit and is suitable for mounting in various positions, in order to be able to seal the lower end of a selected one of the conduits.

The piping described in the foregoing is suited for the completion of groundwater monitoring sites and sampling wells of low up to substantial depths. The completion procedure is easy, and the depths of the individual filter sections can be accurately determined from above ground. The pipe lengths may be made particularly of plastics at low cost, slots for the formation of the filter sections being only required in the area of one conduit of one or several pipe lengths.

Where necessary, the filter sections may be supplemented by gravel casings in the conventional manner. While the described piping configuration incorporating four conduits is advantageous for a plurality of applications, it is recognized that the invention may equally well be implemented using a smaller or greater number of conduits. The essential aspect is above all that the orifice of the individual conduits is dimensioned sufficiently large to be able to introduce pumps or probes of customary size.

We claim:

1. A piping for the completion of a groundwater monitoring site including several monitoring points disposed in a common bore hole at different depths, comprising:
   a single multi-conduit pipe composed of individual pipe lengths which are coupled to each other in a sealed relationship, said pipe lengths formed of thermoplastic plastics, said individual pipe lengths having a smooth, tightly packable outer wall which is packed into the ground, said pipe lengths are subdivided in a longitudinal direction into several conduits by partition walls, a dummy conduit formed in a center of a cross section of said pipe lengths, said dummy conduit for avoiding an accumulation of materials caused by said partition walls converging there when extruded, said pipe lengths are coupled to each other such that respective conduits are in relative alignment at junctures and not reduced in area, and said single multi-conduit pipe providing filter sections for filtering water admitted thereto, wherein individual pipe lengths are provided, in their outer wall, with a plurality of filter slots in an area of one or several conduits.

2. The piping as claimed in claim 1, wherein pipe ends of the multi-conduit pipe lengths include cylindrical annular flanges which are adapted to be connected together by a cap nut, as well as locating means ensuring coaxial alignment of the conduits.

3. The piping as claimed in any one of the claims 1 or 2, wherein a sealing means is arranged between the pipe ends of adjacent pipe lengths, said sealing means has apertures located in an area of at least one conduit and carries on both sides seals resting against end surfaces of the pipe lengths.

4. The piping as claimed in claim 3, wherein a sealing means which is closed only in an area of one conduit, with the closed area being adapted to be provided in a selected one of the conduits.

5. The piping as claimed in claim 4, wherein the sealing means has on either side a pin engaging in a dummy conduit.

6. The piping as claimed in claim 4, wherein the sealing means includes locating projections engaging in mating recesses in the pipe lengths.

7. A piping for the completion of a groundwater monitoring site including several monitoring points disposed in a common borehole at different depths, comprising:

a single multi-conduit pipe composed of individual pipe lengths which are coupled to each other in a sealed relationship, said individual pipe lengths having a smooth, tightly packable outer wall which is packed into the ground, said pipe lengths are subdivided in a longitudinal direction into several conduits by partition walls and are coupled to each other such that respective conduits are in relative alignment at junctures and not reduced in area, and said single multi-conduit pipe providing filter sections for admission of water, wherein individual pipe lengths are provided in their outer wall filter slots in an area of one or several conduits; and a sealing means arranged between pipe ends of adjacent pipe lengths, said sealing means has apertures located in an area of at least one conduit and carries on both sides seals resting against end surfaces of the pipe lengths, wherein said sealing means is closed only in an area of one conduit, with the closed area being adapted to be provided in a selected one of the conduits.

* * * * *